US012756020B2

(12) United States Patent
Pan et al.

(10) Patent No.: US 12,756,020 B2
(45) Date of Patent: Oct. 6, 2026

(54) ELECTROLYTE COMPOSITION

(71) Applicant: National Kaohsiung University of Science and Technology, Kaohsiung (TW)

(72) Inventors: Chun-Jern Pan, Kaohsiung (TW); Chun-I Lee, Kaohsiung (TW); Chun-Hsien Kuo, Kaohsiung (TW); Chi-Fang Weng, Kaohsiung (TW); Bing-Joe Hwang, Kaohsiung City (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 779 days.

(21) Appl. No.: 18/081,333

(22) Filed: Dec. 14, 2022

(65) Prior Publication Data

US 2024/0039053 A1 Feb. 1, 2024

(30) Foreign Application Priority Data

Jul. 26, 2022 (TW) ................................. 111127882
Nov. 15, 2022 (TW) ................................. 111143569

(51) Int. Cl.
*H01M 10/00* (2006.01)
*H01M 10/36* (2010.01)

(52) U.S. Cl.
CPC .................... *H01M 10/365* (2013.01); *H01M 2300/0002* (2013.01); *H01M 2300/0091* (2013.01)

(58) Field of Classification Search
CPC ........... H01M 10/0563; H01M 10/365; H01M 2300/0002; H01M 2300/0091
See application file for complete search history.

(56) References Cited

U.S. PATENT DOCUMENTS

2021/0336293 A1 10/2021 Ji et al.

FOREIGN PATENT DOCUMENTS

CN 114566390 A * 5/2022 ............. H01G 11/68

OTHER PUBLICATIONS

Qu et al Remodelling method of self-adaptive electrode material hole structure, electrode material and application thereof May 2022.*

* cited by examiner

*Primary Examiner* — Tiffany Legette
*Assistant Examiner* — Monique M Wills
(74) *Attorney, Agent, or Firm* — MUNCY, GEISSLER, OLDS & LOWE, P.C.

(57) ABSTRACT

Disclosed herein is an electrolyte composition that includes zinc chloride, an alkali metal chloride, acetonitrile, and water.

5 Claims, 2 Drawing Sheets

ELECTROLYTE COMPOSITION

CROSS-REFERENCE TO RELATED APPLICATION

This application claims priorities of Taiwanese Invention Patent Application Nos. 111127882 and 111143569, respectively filed on Jul. 26, 2022 and Nov. 15, 2022.

FIELD

The present disclosure relates to an electrolyte composition, and more particularly to an electrolyte composition suitable for use as an electrolyte for a secondary battery.

BACKGROUND

Recently, lithium-ion (Li-ion) batteries are exclusive in the secondary battery market, but have the disadvantages of being inflexible, not resistant to high temperatures, and easy to catch fire. In 2018, researchers in the United States developed aqueous zinc-ion batteries (AZIBs) by combining zinc-ion battery technology with aqueous electrolyte technology. Aqueous zinc-ion battery is rechargeable and has the advantages of large battery capacity and will not explode or catch fire. In addition, zinc is highly prized due to its low cost and redox potential, high earth-abundance and aqueous electrolyte compatibility. Therefore, aqueous zinc-ion battery is an ideal substitute for Li-ion battery.

During the cyclic charge-discharge (CCD) process of the aqueous zinc-ion battery, the free water in the aqueous electrolyte would cause the zinc ion to be unstable during the deposition process, thus leading to the formation of passivated zinc products and the occurrence of side reactions. The free water in the aqueous electrolyte might also cause the material of the positive electrode to be easily dissolved or cause the battery to produce gas, resulting in a rapid decay of the battery capacity of the aqueous zinc-ion battery. Furthermore, the passivated zinc product might not be dissolved during the discharge process, so it would pierce the separator and would be in contact with the positive electrode after long-term accumulation, which will lead to short-circuit damage to the aqueous zinc-ion battery.

US 20210336293 A1 discloses a water-in-salt electrolyte for a zinc metal battery, which includes a zinc halide, a metal halide or nonmetal halide, and water. The metal halide or nonmetal halide includes a metal or a nonmetal cation $Q^{x+}$, where x is an integer from 1 to 4, and Q is an alkali metal, an alkaline earth metal, a Group IIIA metal, a transition metal other than Zn, a nonmetal cation, or any combination thereof. The alkali metal ions have a high charge density, which allows the alkali metal ions to tightly bind water molecules. Coordination of water molecules to the alkali metal ions reduces the number of water molecules available to coordinate with $Zn^{2+}$ ions, resulting in an incomplete hydration shell for $Zn^{2+}$. In addition, the increased ion density provided by the inclusion of alkali metal ions further breaks hydrogen-bond networks within the electrolyte and decreases the number of free water molecules by competing against $Zn^{2+}$ ions for water molecules.

In spite of the aforesaid, there is still a need to develop an electrolyte composition for a secondary battery, which can effectively reduce the adverse effects of the free water in the aqueous electrolyte on the secondary battery.

SUMMARY

Therefore, an object of the present disclosure is to provide an electrolyte composition, which can alleviate at least one of the drawbacks of the prior art, and which includes zinc chloride, an alkali metal chloride, acetonitrile, and water.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
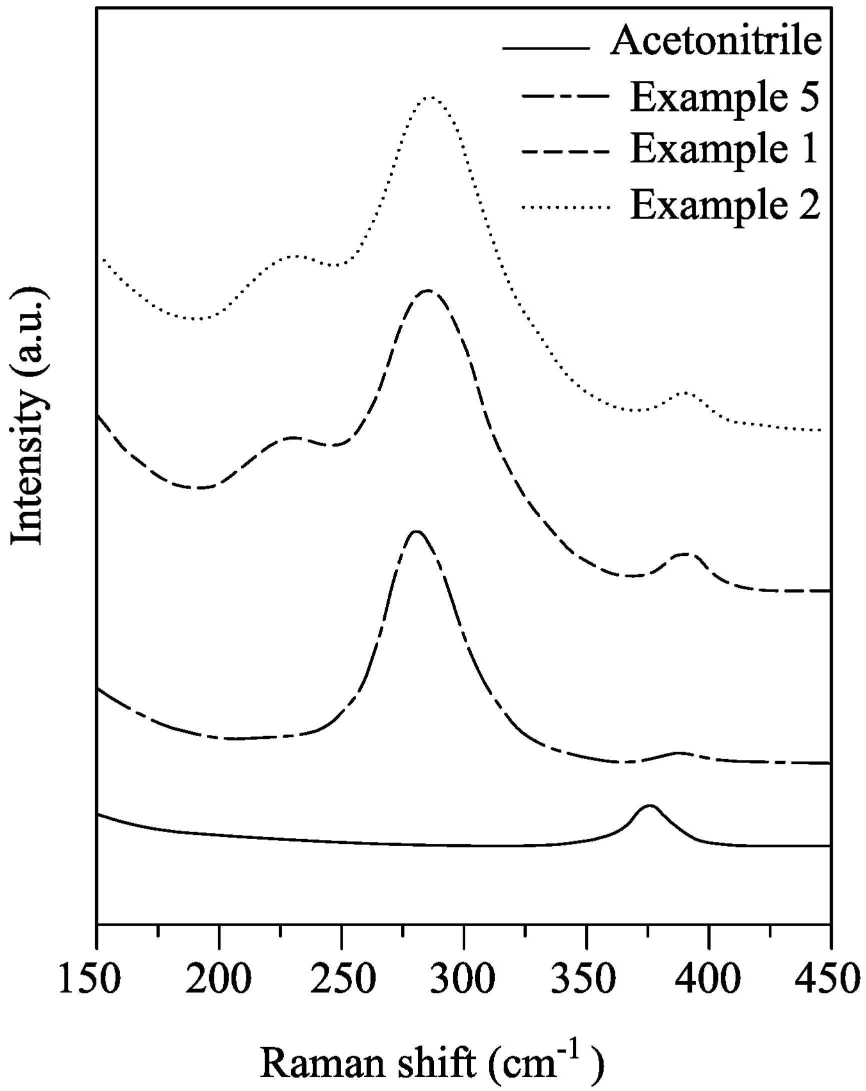
FIG. 1 shows the Raman spectra of the electrolytes of EX1, EX2, and EX5 and acetonitrile at Raman shift region between 150 $cm^{-1}$ to 450 $cm^{-1}$.

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides an electrolyte composition including, zinc chloride ($ZnCl_2$) serving as an electrolyte, an alkali metal chloride (i.e., a group IA metal chloride), acetonitrile serving as an additive, and water serving as a solvent.

In certain embodiments, the alkali metal chloride may be selected from the group consisting of lithium chloride (LiCl), sodium chloride (NaCl), potassium chloride (KCl), and combinations thereof.

According to the present disclosure, the zinc chloride, the alkali metal chloride, and the acetonitrile are dissolved in the water to form coordinate bonds, so as to obtain an electrolyte. The electrolyte can be used to prepare a secondary battery (such as a metal-ion battery).

To be specific, by virtue of the electrolyte composition including the acetonitrile, the Raman spectrum of the electrolyte formed by the electrolyte components shows: (1) the coordination bond formed by the cyano group (CN group) of the acetonitrile and the zinc ion ($Zn^{2+}$) of the zinc chloride, (2) the coordination bond formed by the cyano group and the alkali metal ion of the alkali metal chloride, (3) the coordination bond formed by the acetonitrile and the zinc ion, (4) the coordination bond formed by the acetonitrile and the alkali metal ion, and (5) the coordination bond formed by the acetonitrile and the water.

The coordination between the acetonitrile and its cyano group and the zinc ion can indirectly affect the interaction between the zinc ion and the water. The coordination between the acetonitrile and its cyano group and the alkali metal ion can indirectly affect the interaction between the alkali metal ion and the water. Furthermore, the acetonitrile and the water can directly form a coordination bond, such that the free water in the electrolyte is effectively reduced, and thus, the electrolyte has a lower water activity. Therefore, by virtue of the acetonitrile, the secondary battery containing the electrolyte is not easy to age and has better charge-discharge cycling performance.

In certain embodiments, in the electrolyte composition, the zinc chloride is present in a molality ranging from 19 mol/kg to 40 mol/kg, based on the total weight of the water. In the presence of the acetonitrile, when the zinc chloride is present in a molality not lower than 19 mol/kg, the electrolyte has a lower content of the free water, thereby improving the charge-discharge cycling performance of the secondary battery. In addition, when the molality of the zinc chloride is up to 40 mol/kg, the electrolyte is still clear without forming precipitates. In an exemplary embodiment, the zinc chloride is present in a molality ranging from 25 mol/kg to 40 mol/kg, based on the total weight of the water.

In certain embodiments, in the electrolyte composition, the alkali metal chloride is present in a molality ranging from 1 mol/kg to 22 mol/kg, based on the total weight of the water. By setting the minimum molality of the alkali metal chloride to 1 mol/kg, a data map with an obvious curve for the secondary battery containing the electrolyte can be obtained when performing a battery performance test. In addition, in the presence of the acetonitrile, when the molality of the alkali metal chloride is up to 22 mol/kg, the electrolyte is still clear without forming precipitates. In an exemplary embodiment, the alkali metal chloride is present in a molality ranging from 11 mol/kg to 22 mol/kg, based on the total weight of the water.

In certain embodiments, in the electrolyte composition, the acetonitrile is present in a molality ranging from 6 mol/kg to 12 mol/kg, based on the total weight of the water. When the acetonitrile is present in a molality not lower than 6 mol/kg, the charge-discharge cycling performance of the secondary battery is significantly improved. In addition, when the molality of the acetonitrile is up to 12 mol/kg, the electrolyte is still in the state of a solution and will not solidify. In an exemplary embodiment, the acetonitrile is present in a molality ranging from 8 mol/kg to 12 mol/kg, based on the total weight of the water.

According to the present disclosure, the secondary battery suitable for use in this disclosure may include a positive electrode and a negative electrode disposed at intervals, a separator disposed between the positive electrode and the negative electrode, and an electrolyte which is formed by the electrolyte composition of the present disclosure and which contacts the positive electrode and the negative electrode. Examples of the positive electrode may include, but are not limited to, stainless steel, tungsten, zinc, copper, lead, indium, lithium iron phosphate ($LiFePO_4$), sodium vanadium phosphate ($Na_3V_2(PO_4)_3$), lithium vanadium phosphate ($Li_3V_2(PO_4)_3$), potassium vanadium phosphate ($K_3V_2(PO_4)_3$), and lithium manganate (such as $LiMnO_2$, $Li_2MnO_3$, and $Li_2MnO_4$). Examples of the negative electrode may include, but are not limited to, zinc, copper, lead, tungsten, and indium. The separator may be made of glass fiber and may have a thickness ranging from 200 μm to 1000 μm. In an exemplary embodiment, the secondary battery is a zinc-ion battery.

By virtue of the ligands of the acetonitrile respectively forming a coordination bond with the water, a coordination bond with the zinc ion of the zinc chloride, and a coordination bond with the alkali metal ion of the alkali metal chloride, the electrolyte formed by the electrolyte composition has a lower content of the free water, so that the secondary battery containing the electrolyte is not easy to age and has better charge-discharge cycling performance.

The disclosure will be further described by way of the following examples. However, it should be understood that the following examples are solely intended for the purpose of illustration and should not be construed as limiting the disclosure in practice.

EXAMPLES

Examples 1 to 5 (EX1 to EX5)

Each of the electrolytes of EX1 to EX5 was prepared using the corresponding recipe shown in Table 1, and the preparation procedures of these electrolytes are described as follows.

Zinc chloride ($ZnCl_2$) was dissolved in deionized water (25° C.), followed by adding acetonitrile (serving as an additive) and stirring for 30 minutes to obtain a mixture. Next, lithium chloride (LiCl) (serving as an alkali metal chloride) was added to the mixture, followed by heating and stirring at 80° C. until the lithium chloride was completely dissolved, so as to obtain a clear and homogeneous electrolyte.

Comparative Examples 1 to 2 (CE1 to CE2)

Each of the electrolytes of CE1 to CE2 was prepared using the corresponding recipe shown in Table 1, and the preparation procedures of these electrolytes are described as follows.

Zinc chloride was dissolved in deionized water (25° C.), and then mixed with lithium chloride (serving as an alkali metal chloride), followed by heating and stirring at 80° C. until the lithium chloride was completely dissolved, so as to obtain a clear and homogeneous electrolyte.

Comparative Examples 3 to 4 (CE3 to CE4)

Each of the electrolytes of CE3 to CE4 was prepared using the corresponding recipe shown in Table 1, and the preparation procedures of these electrolytes are described as follows.

Zinc chloride was added into deionized water (25° C.), followed by stirring at room temperature until the zinc chloride was completely dissolved, so as to obtain a clear and homogeneous electrolyte.

Comparative Example 5 (CE5)

The electrolyte of CE5 was prepared using the corresponding recipe shown in Table 1, and the preparation procedures of these electrolytes are described as follows.

Zinc chloride was added into deionized water (25° C.), followed by stirring continuously. After stirring for 48 hours, the zinc chloride could not be completely dissolved, so the stirring was stopped, thereby obtaining a turbid electrolyte having precipitates.

Comparative Example 6 (CE6)

The electrolyte of CE6 was prepared using the corresponding recipe shown in Table 1, and the preparation procedures of these electrolytes are described as follows.

Zinc chloride was dissolved in deionized water (25° C.), followed by adding ethylene carbonate (serving as an additive) and stirring for 30 minutes to obtain a mixture. Next, lithium chloride (serving as an alkali metal chloride) was added to the mixture, followed by heating and stirring at 80° C. After stirring for 24 hours, the lithium chloride could not be completely dissolved, so the stirring was stopped, thereby obtaining a turbid electrolyte having precipitates.

Comparative Example 7 (CE7)

The electrolyte of CE7 was prepared using the corresponding recipe shown in Table 1, and the preparation procedures of these electrolytes are described as follows.

Zinc chloride was dissolved in deionized water (25° C.), followed by adding propylene carbonate (serving as an additive) and stirring for 30 minutes to obtain a mixture. Next, lithium chloride (serving as an alkali metal chloride) was added to the mixture, followed by heating and stirring at 80° C. until the lithium chloride was completely dissolved, so as to obtain a clear and homogeneous electrolyte.

It can be seen from Table 1 that the electrolyte composition of CE5 contained no acetonitrile, so zinc chloride (32 mol/kg) could not be completely dissolved. In addition, the electrolyte composition of CE6 contained ethylene carbonate as an additive, so lithium chloride (19 mol/kg) could not be completely dissolved.

On the contrary, the electrolyte compositions of EX1 to EX5 contained acetonitrile, so zinc chloride and lithium chloride could be completely dissolved. These results indicate that acetonitrile can improve the solubility of zinc chloride and lithium chloride (i.e., an alkali metal chloride) in water, so that the electrolyte prepared from the electrolyte composition of the present disclosure has clear and homogeneous appearance.

analysis using a RAMaker micro Raman spectrometer (ProTrusTech Co., Ltd.). The results are shown in FIGS. 1 and 2.

Referring to FIG. 1, in the Raman spectrum of the respective one of the electrolytes of EX1, EX2, and EX5, the characteristic peak at 370 $cm^{-1}$ was due to the presence of the coordination bond formed between $Zn^{2+}$ and the CN group (cyano group) of acetonitrile and the coordination bond formed between $Li^{+}$ and CN group. The characteristic peak at 286 $cm^{-1}$ was due to the presence of $[ZnCl_{2+x}(H_2O)_y]^{x-}$, wherein x and y respectively represented an integer ranging from greater than 0 to ≤2. The characteristic peak at 228 $cm^{-1}$ was formed due to the presence of $ZnCl_4^{2-}$, and the intensity of this characteristic peak enhanced with the increase of the molality of zinc chloride.

Figure 2:
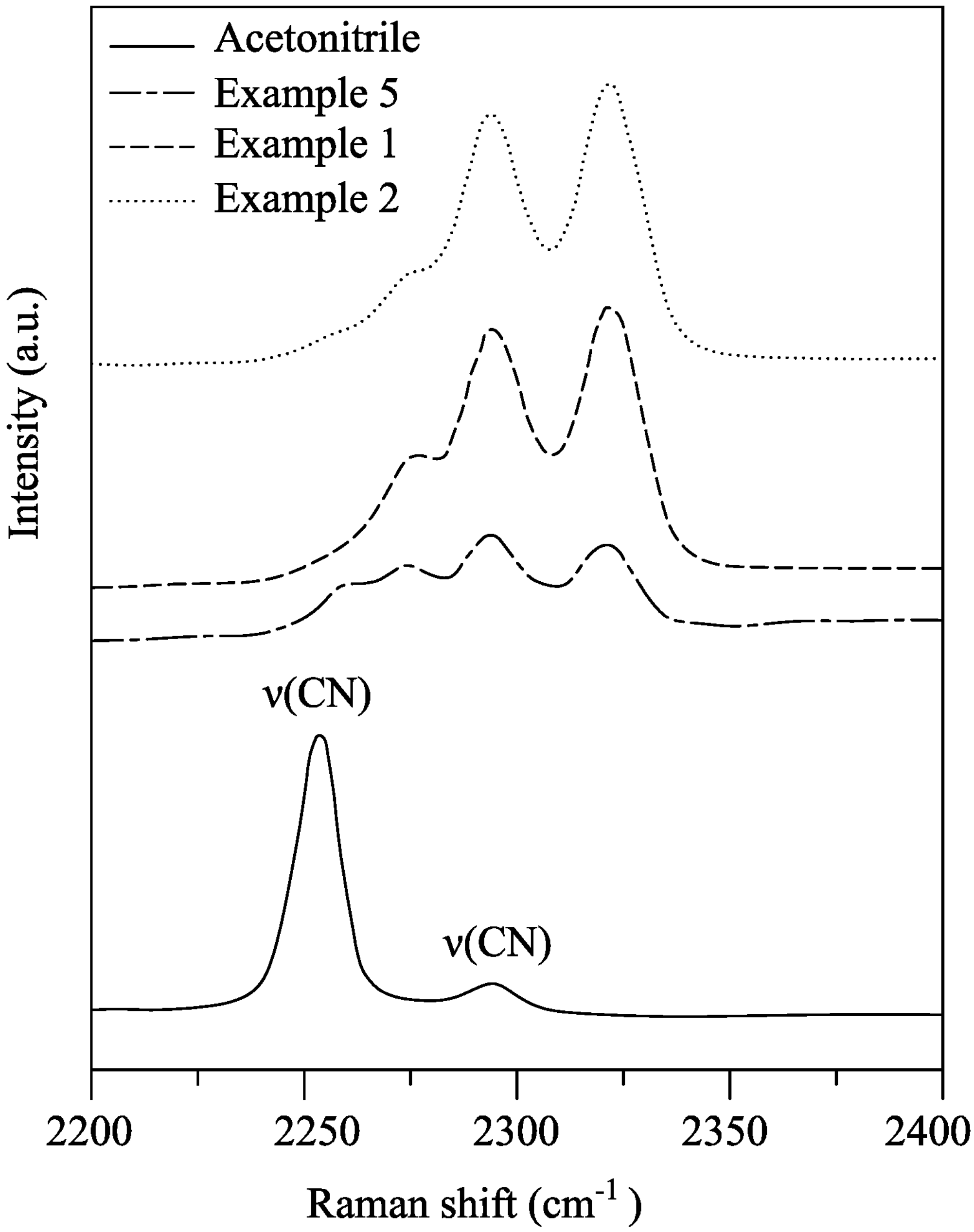
FIG. 2 shows the Raman spectra of the electrolytes of EX1, EX2, and EX5 and acetonitrile at Raman shift region between 2200 $cm^{-1}$ to 2400 $cm^{-1}$.

Referring to FIG. 2, in the Raman spectrum of acetonitrile, a characteristic peak at 2259 $cm^{-1}$ was detected. On the contrary, in the Raman spectrum of the respective one of the electrolytes of EX1, EX2, and EX5, a characteristic peak which shifted from 2259 $cm^{-1}$ to 2275 $cm^{-1}$ was observed, indicating that in the respective one of the electrolytes of EX1, EX2, and EX5, a coordination bond was formed between acetonitrile and water, resulting in the characteristic peak at 2275 $cm^{-1}$.

In addition, the characteristic peak at 2293 $cm^{-1}$ was due to the presence of $Zn^{2+}(CH_3CN)$, and the characteristic peak at 2332 $cm^{-1}$ was due to the presence of $Li^{+}(CH_3CN)$, indicating that in the respective one of the electrolytes of EX1, EX2, and EX5, a coordination bond was formed between acetonitrile and $Zn^{2+}$, and a coordination bond was formed between acetonitrile and $Li^{+}$.

TABLE 1

| | Electrolyte composition | | | | | |
|---|---|---|---|---|---|---|
| | Zinc chloride | Alkali metal chloride | | Additive | | |
| | Molality (mol/kg) | Type | Molality (mol/kg) | Type | Molality (mol/kg) | Electrolyte Appearance |
| EX1 | 25 | LiCl | 19 | Acetonitrile | 8 | Clear and homogeneous |
| Ex2 | 30 | LiCl | 19 | Acetonitrile | 8 | Clear and homogeneous |
| EX3 | 30 | LiCl | 22 | Acetonitrile | 8 | Clear and homogeneous |
| EX4 | 40 | LiCl | 19 | Acetonitrile | 8 | Clear and homogeneous |
| EX5 | 19 | LiCl | 19 | Acetonitrile | 8 | Clear and homogeneous |
| CE1 | 20 | LiCl | 10 | — | 0 | Clear and homogeneous |
| CE2 | 30 | LiCl | 5 | — | 0 | Clear and homogeneous |
| CE3 | 7.5 | — | 0 | — | 0 | Clear and homogeneous |
| CE4 | 20 | — | 0 | — | 0 | Clear and homogeneous |
| CE5 | 32 | — | 0 | — | 0 | Turbid and precipitation |
| CE6 | 40 | LiCl | 19 | Ethylene carbonate | 8 | Turbid and precipitation |
| CE7 | 40 | LICL | 19 | Propylene carbonate | 8 | Clear and homogeneous |

Property Evaluation

A. Raman Spectroscopy Analysis

The electrolyte of the respective one of EX1, EX2, and EX5 and acetonitrile were subjected to Raman spectroscopy B. Battery Performance Test A copper material (serving as a positive electrode), a zinc material (serving as a negative electrode), the electrolyte of EX1, a glass fiber separator (Manufacturer: Whatmann; thickness: 280 μm), and a nickel tab having a length of 60 mm, a width of 2 mm, and a thickness of 100 μm (serving as a current collector) (Guangdong Canrd New Energy Technology Co., Ltd.) were assembled, so as to obtain a pouch cell of Application Example 1-1 (AE1-1). The pouch cell of AE1-1 was subjected to battery charge- and discharge test using NEWARE CT-4008-5V20mA-164 advance battery testing system and the operation conditions shown in Table 2 below.

The coulombic efficiency (%) of the last cycle was calculated using the following Equation (I):

$$A=(B/C)\times 100 \quad \text{(I)}$$

where A=coulombic efficiency (%) of the last cycle

B=specific discharge capacity of the last cycle

C=specific charge capacity of the last cycle

In addition, the specific capacity retention rate (%) was calculated using the following Equation (II):

$$D=(E/F)\times 100 \quad \text{(II)}$$

where D=specific capacity retention rate (%)

E=specific capacity of the last cycle

F=specific capacity of the first cycle

The procedures for preparing the pouch cells of AE1-2 to AE1-6, AE2-1 to AE2-8, AE4, Comparative Application Examples 1 to 4 (CAE1 to CAE4), and CAE6 to CAE7 were similar to those of AE1-1, except that the positive electrode and the negative electrode used for making the pouch cell were varied as shown in Table 2 below. The pouch cells of AE1-2 to AE1-6, AE2-1 to AE2-8, AE4, CAE1 to CAE4, and CAE6 to CAE7 were subjected to the same battery performance test as described above, and the operation conditions were varied as shown in Table 2 below.

The results are shown in Table 2 below. It can be seen from Table 2 that the pouch cells, which were formed by combining a respective one of the electrolytes of EX1 and EX2 with various types of positive and negative electrodes, had excellent charge-discharge cycling performance, and hence can be used for the assembly of secondary batteries.

In addition, when sodium vanadium phosphate ($Na_3V_2(PO_4)_3$) served as a positive electrode and zinc served as a negative electrode, and under the same operation conditions of the battery performance test, the coulombic efficiency (%) of the last cycle and the specific capacity retention rate (%) determined for the pouch cells of AE1-6 and AE2-8 were higher than those determined for the pouch cells of CAE1 to CAE4. These results indicate that the pouch cell made from the electrolyte of EX1 or EX2 is not easy to age, and the acetonitrile contained in the electrolytes of EX1 and EX2 can improve the charge-discharge cycling performance of the secondary battery.

Moreover, when lithium manganate ($Li_2MnO_4$) served as a positive electrode and zinc served as a negative electrode, and under the same operation conditions of the battery performance test, the specific capacity retention rate (%) determined for the pouch cell of AE4 was higher than that determined for the pouch cells of CAE6 and CAE7. This result indicates that the pouch cell made from the electrolyte of EX4 is not easy to age, and the acetonitrile contained in the electrolyte of EX4 can improve the charge-discharge cycling performance of the secondary battery.

Summarizing the above test results, it is clear that by virtue of the electrolyte composition including the acetonitrile, the electrolyte formed by the electrolyte composition has low water activity, and the secondary battery made from the electrolyte is not easy to age and has excellent charge-discharge cycling performance.

TABLE 2

| | | | Operation condition for battery performance test | | | Result | |
|---|---|---|---|---|---|---|---|
| Pouch cell | Positive electrode | Negative electrode | Ambient temperature (C.) | Current density (mA/cm$^2$) | Charge-discharge cycling (cycle) | Coulombic efficiency (%) of the last cycle | Specific capacity retention rate (%) |
| AE1-1 | Copper | Zinc | 40 | 0.5 | 1600 | 99.8 | Not determined |
| | | | 30 | | 375 | 99.9 | Not determined |
| AE1-2 | Indium | Zinc | 30 | 0.5 | 150 | 99.8 | Not determined |
| | | | | | 450 | 99.7 | Not determined |
| AE1-3 | Lithium iron phosphate ($LiFePO_4$) | Zinc | 30 | 100 | 140 | 99.8 | 94.8 |
| AE1-4 | Sodium vanadium phosphate ($Na_3V_2(PO_4)_3$) | Lead | 30 | 100 | 300 | 99.5 | 98.1 |
| | | | | | 375 | 99.45 | 90.45 |
| AE1-5 | $Na_3V_2(PO_4)_3$ | Indium | 30 | 100 | 400 | 99.4 | 98.5 |
| | | | | | 415 | 99.34 | 98.5 |
| AE1-6 | $Na_3V_2(PO_4)_3$ | Zinc | 30 | 100 | 170 | 99.9 | 99.9 |
| AE2-1 | Zinc | Zinc | 40 | 1 | 400 | 99.9 | Not determined |
| AE2-2 | Copper | Zinc | 40 | 0.5 | 1600 | 99.8 | Not determined |
| | | | 30 | | 375 | 99.9 | Not determined |
| AE2-3 | Lead | Zinc | 30 | 0.5 | 375 | 99.9 | Not determined |

TABLE 2-continued

| Pouch cell | Positive electrode | Negative electrode | Operation condition for battery performance test: Ambient temperature (C.) | Current density (mA/cm$^2$) | Charge-discharge cycling (cycle) | Result: Coulombic efficiency (%) of the last cycle | Specific capacity retention rate (%) |
|---|---|---|---|---|---|---|---|
| AE2-4 | Indium | Zinc | 30 | 0.5 | 150 | 99.8 | Not determined |
| | | | | | 450 | 99.5 | Not determined |
| AE2-5 | $LiFePO_4$ | Zinc | 30 | 100 | 140 | 99.9 | 95.4 |
| AE2-6 | $Na_3V_2(PO_4)_3$ | Lead | 30 | 100 | 300 | 99.9 | 97.2 |
| | | | | | 375 | 99.9 | 96.9 |
| AE2-7 | $Na_3V_2(PO_4)_3$ | Indium | 30 | 100 | 400 | 99.5 | 98.43 |
| | | | | | 415 | 99.43 | 98.4 |
| AE2-8 | $Na_3V_2(PO_4)_3$ | Zinc | 30 | 100 | 170 | 99.9 | 99.9 |
| AE4 | Lithium manganate ($Li_2MnO_4$) | Zinc | 30 | 500 | 250 | 99.4 | 94.3 |
| CAE1 | $Na_3V_2(PO_4)_3$ | Zinc | 30 | 100 | 170 | 99.1 | 67.3 |
| CAE2 | $Na_3V_2(PO_4)_3$ | Zinc | 30 | 100 | 170 | 99.5 | 85.5 |
| CAE3 | $Na_3V_2(PO_4)_3$ | Zinc | 30 | 100 | 170 | 86.9 | 38.2 |
| CAE4 | $Na_3V_2(PO_4)_3$ | Zinc | 30 | 100 | 170 | 98.9 | 87.0 |
| CAE6 | $Li_2MnO_4$ | Zinc | 30 | 500 | 250 | 99.4 | 88.85 |
| CAE7 | $Li_2MnO_4$ | Zinc | 30 | 500 | 250 | 99.54 | 80.12 |

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electrolyte composition for a secondary battery, comprising:

zinc chloride, an alkali metal chloride, acetonitrile, and water, wherein the acetonitrile is present in a molality ranging from 6 mol/kg to 12 mol/kg, the zinc chloride is present in a molality ranging from 19 mol/kg to 40 mol/kg, and the alkali metal chloride is present in a molality ranging from 1 mol/kg to 22 mol/kg, based on the total weight of the water, wherein the secondary battery includes a positive electrode and a negative electrode disposed at intervals, a separator disposed between the positive electrode and the negative electrode, and an electrolyte which is formed by the electrolyte composition and which contacts the positive electrode and the negative electrode, wherein the positive electrode is selected from the group consisting of stainless steel tungsten, zinc, copper, lead, indium, lithium iron phosphate, sodium vanadium phosphate, lithium vanadium phosphate, potassium vanadium phosphate, and lithium manganite, and wherein the negative electrode is selected from the group consisting of zinc, copper, lead, tungsten, and indium.

2. The electrolyte composition for the secondary battery as claimed in claim 1, wherein the alkali metal chloride is selected from the group consisting of lithium chloride, sodium chloride, potassium chloride, and combinations thereof.

3. The electrolyte composition for the secondary battery as claimed in claim 1, wherein the acetonitrile is present in a molality ranging from 8 mol/kg to 12 mol/kg, based on the total weight of the water.

4. The electrolyte composition for the secondary battery as claimed in claim 1, wherein the zinc chloride is present in a molality ranging from 25 mol/kg to 40 mol/kg, based on the total weight of the water.

5. The electrolyte composition for the secondary battery as claimed in claim 1, wherein the alkali metal chloride is present in a molality ranging from 11 mol/kg to 22 mol/kg, based on the total weight of the water.

* * * * *